(12) United States Patent
Liebert

(10) Patent No.: US 11,932,234 B2
(45) Date of Patent: Mar. 19, 2024

(54) MOTOR VEHICLE HAVING AT LEAST TWO DRIVE MOTORS AND HAVING AN AUTOMATIC GEARBOX THAT HAS ONE FIXED AND ONE POWER-SPLIT TRANSMISSION RATIO

(71) Applicant: Bayerische Motoren Werke Aktiengesellschaft, Munich (DE)

(72) Inventor: Sebastian Liebert, Unterfoehring (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/013,036

(22) PCT Filed: Aug. 6, 2021

(86) PCT No.: PCT/EP2021/071964
§ 371 (c)(1),
(2) Date: Dec. 27, 2022

(87) PCT Pub. No.: WO2022/043022
PCT Pub. Date: Mar. 3, 2022

(65) Prior Publication Data
US 2023/0242093 A1 Aug. 3, 2023

(30) Foreign Application Priority Data
Aug. 26, 2020 (DE) ...................... 10 2020 122 362.5

(51) Int. Cl.
*B60W 20/30* (2016.01)
*B60W 10/08* (2006.01)
(Continued)

(52) U.S. Cl.
CPC ............ *B60W 20/30* (2013.01); *B60W 10/08* (2013.01); *B60W 10/115* (2013.01);
(Continued)

(58) Field of Classification Search
CPC .... B60W 20/30; B60W 10/08; B60W 10/105; B60W 10/115; B60W 30/19; B60W 2510/1025
See application file for complete search history.

(56) References Cited

U.S. PATENT DOCUMENTS 8,308,593 B2 * 11/2012 Kumazaki .............. B60K 6/445
475/5
8,930,101 B2 * 1/2015 Otsubo ................. B60W 20/00
701/55
(Continued)

FOREIGN PATENT DOCUMENTS

DE 10 2007 044 107 A1 3/2009
DE 10 2017 217 133 A1 3/2019
DE 10 2018 205 710 A1 10/2019

OTHER PUBLICATIONS

International Search Report (PCT/ISA/210) issued in PCT Application No. PCT/EP2021/071694 dated Oct. 28, 2021 with English translation (four (4) pages).

(Continued)

*Primary Examiner* — Derek D Knight
(74) *Attorney, Agent, or Firm* — Crowell & Moring LLP

(57) ABSTRACT

A motor vehicle has at least two drive motors, at least one drive motor being an electric machine; a high-voltage accumulator; and an automatic gearbox, having at least one fixed transmission ratio and at least one power-split transmission ratio for transmission regulation starting from the at least one fixed transmission ratio. The motor vehicle further includes an electronic control unit, which is designed such that, when a gear change command is present, the shifting element to be opened of the fixed transmission ratio to be disengaged is unloaded in a torque-controlled manner by at least two of the drive motors. For the shifting element to be opened, the torque load is calculated and observed. The (Continued)

torque load is observed with the objective of bringing about a load change by way of a zero crossing in order to produce a no-load state at the shifting element. For producing the no-load state of the shifting element to be opened, a first drive motor and a second drive motor are controlled in a power split manner such that they, in terms of rotational speeds, maintain the transmission of the previously engaged fixed transmission ratio, and, in terms of torque, put the shifting element to be opened in an at least nearly no-load state, and a load change is brought about at the shifting element to be opened by a differential rotational speed, opposite the calculated torque load at the shifting element to be opened, being specified at the shifting element.

6 Claims, 14 Drawing Sheets

(51) Int. Cl.
*B60W 10/115* (2012.01)
*B60W 30/19* (2012.01)

(52) U.S. Cl.
CPC ..... *B60W 30/19* (2013.01); *B60W 2510/1025* (2013.01); *B60W 2710/1022* (2013.01)

(56) References Cited

U.S. PATENT DOCUMENTS

| 9,896,084 | B2* | 2/2018 | Iwase | B60K 6/387 |
| 2019/0315337 | A1* | 10/2019 | Weidenbach | B60W 20/30 |
| 2020/0217399 | A1 | 7/2020 | Kluge et al. | |

OTHER PUBLICATIONS

German-language Written Opinion (PCT/ISA/237) issued in PCT Application No. PCT/EP2021/071694 dated Oct. 28, 2021 (eight (8) pages).

German-language Search Report issued in German Application No. 10 2020 122 362.5 dated May 17, 2021 with partial English translation (11 pages).

* cited by examiner

MOTOR VEHICLE HAVING AT LEAST TWO DRIVE MOTORS AND HAVING AN AUTOMATIC GEARBOX THAT HAS ONE FIXED AND ONE POWER-SPLIT TRANSMISSION RATIO

BACKGROUND AND SUMMARY

The invention relates to a motor vehicle comprising at least two drive motors, wherein at least one drive motor is an electric motor, comprising a high-voltage accumulator, comprising an automatic transmission which has at least one fixed gear ratio and at least one power-split gear ratio for gear ratio adjustment starting from the at least one fixed gear ratio, and comprising an electronic control unit.

Automatic transmissions for motor vehicles are known. Automatic transmissions for hybrid electric vehicles are also known which, in addition to an internal combustion engine, also have at least one electric motor for the drive. Current automatic transmissions for hybrid electric vehicles (hybrid transmissions) are usually based on existing automatic transmissions. The electric motor for electrification is usually positioned between the internal combustion engine and the transmission (so-called P2 hybrid). However, this type of hybridization does not bring any advantages for the transmission per se.

Transmissions suitable for hybridization are, for example, powershift automatic transmissions that provide the various fixed gear ratios via frictionally engaged shift elements. In these transmissions, at least one shift element is operated under slip during gear changes. The friction work during slip operation is converted here into heat, which must be dissipated from the frictionally engaged shift elements via a sufficient cooling oil flow. Furthermore, the frictionally engaged shift elements generate corresponding drag losses in the open state. The shift elements are generally hydraulically actuated. To enable them to transmit power in the closed state, the friction plates of the shift elements must be permanently pressed against each other with a correspondingly high hydraulic pressure. The hydraulic pump required for this is used both for cooling and for actuating the shift elements. However, it requires a certain amount of power to operate, which reduces the overall efficiency.

According to the subject matter of DE 10 2017 217 133 A1, an automatic transmission comprising an internal combustion engine, comprising at least two fixed gear ratios, comprising three transmission shafts, comprising an epicyclic gearbox, comprising two shift elements and comprising a variator is provided. In this case, a first side of the variator can be coupled to a first transmission shaft in a torque-transmitting manner and a second side of the variator can be coupled to the epicyclic gearbox via a second transmission shaft in a gear-ratio-adjusting manner. This means that the second side of the variator is in a 3-shaft operation together with the internal combustion engine and an output of the automatic transmission, whereby the second side of the variator has a gear-ratio-adjusting effect on the internal combustion engine via the epicyclic gearbox. The variator enables continuous gear ratio adjustment here. Thus, further gear ratios can be set independently of the fixed gear ratios, in particular any intermediate states between the fixed gear ratios. Preferably, the variator is formed by two electric motors. In this case, one of the electric motors is operated as a generator and the other electric motor as a motor. By temporarily converting mechanical energy into electrical energy, the speeds of the two electric motors can be decoupled, thus providing variator functionality with the two electric motors. The epicyclic gearbox can be a planetary gearbox.

The object of the invention is to improve a hybrid motor vehicle comprising an automatic transmission of the type described at the outset with regard to its gear ratio adjustment.

This object is achieved by the features of the independent claims. Advantageous developments are the subject of the dependent claims.

The invention relates to a motor vehicle comprising at least two drive motors, wherein at least one drive motor is an electric motor, comprising a high-voltage accumulator and comprising an automatic transmission which has at least one fixed gear ratio (fixed gear) and at least one power-split gear ratio (E-CVT) for gear ratio adjustment starting from the at least one fixed gear ratio. For example, leaving a single fixed gear in the power-split gear ratio (E-CVT) is also relevant.

In particular, the invention relates to a motor vehicle comprising an internal combustion engine, comprising at least one electric motor, and comprising an automatic transmission having at least two fixed gear ratios and a variator for gear ratio adjustment between the two fixed gear ratios, wherein the variator comprises, for example, two electric motors. One electric motor may also suffice. In this case, the variator consists of the electric motor and a high-voltage accumulator.

The motor vehicle according to the invention further comprises an electronic control unit which is designed such that, when a gear change command is present,
  the shift element to be opened of the fixed gear ratio to be disengaged is relieved in a torque-controlled manner by at least two of the drive motors,
  the torque load is calculated and observed for the shift element to be opened,
  the torque load is observed with the objective of bringing about a load change by means of a zero crossing in order to establish freedom from load at the shift element,
  for establishing the freedom from load for the shift element to be opened, a first drive motor (e.g. an electric motor) and a second drive motor (e.g. an internal combustion engine) are controlled in a power-split manner such that they maintain the gear ratio of the previously engaged fixed gear ratio (hereinafter also referred to as fixed gear) in terms of the speeds and put the shift element to be opened in an at least nearly load-free state in terms of the torques, and
  a load change is brought about at the shift element to be opened by a differential speed opposite the calculated torque load at the shift element to be opened being specified at the shift element.

For example, the invention has a variator formed by two electric motors. During the gear ratio changes, a first electric motor is operated as a generator and a second electric motor is operated as a motor. However, the first electric motor may also be motor-driven prior to a gear ratio adjustment. This feature is at the core of this invention.

Preferably, the shift elements are interlocking shift elements (e.g. claws). This has the advantage that the shift elements can be held or secured in the closed position with little force. As a result, the energy consumption for maintaining the fixed gear ratios can be reduced, thus increasing the overall efficiency. In addition, there are (virtually) no drag losses in the open state of interlocking shift elements.

According to a further advantageous embodiment of the invention, the first shift element is provided for engaging the first fixed gear ratio and the second shift element is provided for engaging the second fixed gear ratio. This means that each fixed gear ratio is assigned a preferably separate shift element by means of which the gear ratio is engaged and, in particular, held closed. Alternatively, a plurality of shift elements for engaging a fixed gear ratio and/or individual shift elements for engaging a plurality of fixed gear ratios can also be provided.

In this way, the variator can be used to shift between two fixed gear ratios by continuous gear ratio adjustment (E-CVT) whilst simultaneously maintaining the tractive force. Power flows here via the variator only during shifting between the fixed gear ratios, which is usually less efficient than purely mechanical power transmission. In particular, no power flows via the variator when the fixed gear ratio is engaged. As the corresponding shift elements provide the power transmission of the fixed gear ratios, the automatic transmission can thus have a high efficiency.

In the shifting method according to the invention, the first electric motor of the variator can be at least temporarily coupled to the transmission shaft in a torque-transmitting manner in order to inject or withdraw torque into/from the transmission.

Furthermore, the second electric motor of the variator can be coupled at least temporarily via the shaft to the planetary gearbox in a gear-ratio-adjusting manner. This means that the second side of the variator has a gear-ratio-adjusting effect on the internal combustion engine via the epicyclic gearbox, in particular in that the second side of the variator is in a 3-shaft operation together with the internal combustion engine and an output of the automatic transmission.

In principle, reference is made to DE 10 2017 217 133 A1 in full for an explanation of the conceptual transmission design.

Essential to the invention according to the present application is a functional module for adjusting the speed, which is effective in the context of a gear change while relieving the shift element to be disengaged for establishing freedom from load up to the actual disengagement.

The invention is based on the following considerations.

DHT (Dedicated Hybrid Transmission) is currently the most common hybrid transmission, used only in vehicles with an internal combustion engine and at least one electric motor. The electric motor (here the first electric motor of the variator) becomes part of the transmission, wherein it can be connected to different transmission shafts.

The use of interlocking shift elements for gear formation and power transmission in DHT drives offers the opportunity of maximum efficiency in power transmission and minimum power requirements due to demand-oriented actuation. At the same time, however, interlocking shift elements also present challenges. In conventional manual transmissions or similar automated systems, power transmission is completely interrupted before the interlocking shift elements are actuated. This freedom from load allows interlocking shift elements to be opened or disengaged without any repercussion for the drive and with comparatively little effort.

In DHTs, which carry out the gear change by power splitting, the freedom from load for the shift element to be opened or disengaged must be produced by a corresponding division of the torques between the electric motor (first electric motor of the variator), with variable speed in power split, and the internal combustion engine. This is possible in theory; in practice, residual torques arise due to drag torques in the transmission and incorrectly output torques of the electric motor and of the internal combustion engine, which residual torques mean that the shift element to be opened cannot be disengaged with the existing actuating force under certain circumstances.

Therefore, according to the invention, a functional module for adjusting the speed is proposed to actuate the torque controllers of the electric motor and of the internal combustion engine, as well as the interlocking shift element to be disengaged, as follows:

the functional module for adjusting the speed in an electronic control unit (e.g. drive control unit) is designed such that the torque load is calculated by means of a torque observer for the shift element of the (still) engaged gear which is to be opened. In order to be able to subsequently disengage the desired shift element, its torque load must perform a zero crossing or change of direction (load change). Since the observed load does not correspond exactly to the actual load of the shift element, the observed load subsequently is used for a function which has the objective of bringing about a load change on the shift element without producing perceptible oscillations in the drive.

For establishing the freedom from load for the shift element to be disengaged from the old gear, the drive software changes over to power-split operation with respect to the torque-side actuation. This means that the electric motor and the internal combustion engine are controlled such that they maintain the gear ratio of the old gear in terms of the speeds and put the shift element to be disengaged in a nearly load-free state in terms of the torques.

In order to actively bring about a load change at the shift element to be disengaged, the I term of the already active speed regulation of the power split is preferably used. This is done in such a way that a differential speed opposite the load on the shift element is required on the shift element. Due to the still engaged gear, the correspondingly required differential speed causes the I term of the speed controller to change the load on the shift element in such a way that, in the ideal case, it undergoes a load change.

Since the functional module without a torque sensor system is not able to determine the actual time of the load change at the shift element to be disengaged, the actuation of the shift element is already controlled before the start of the load change on the shift element, in order to disengage the shift element. Depending on the type of shift element, this control must be maintained until the shift element is successfully disengaged.

If the shift element to be disengaged is already in a very low-load state before the gear change is triggered, the logic described can lead to an incorrect control of the load change, that is to say increase the actual load on the shift element. In order to eliminate this problem, when a threshold value of the observed torque load on the shift element to be disengaged is exceeded, the sign of the required differential speed on the shift element to be disengaged is changed for the speed controller (I term).

When passing through the load change, the correspondingly actuated shift element is disengaged. This is subsequently detected by the functional module on the basis of the differential speed which builds up. Thereupon, the previously required differential speed is set to zero again, so that the speed controller of the power-split gear can subsequently correctly implement new speed specifications.

The advantage of this logic lies in the fact that the speed controller does not directly control the individual components of the internal combustion engine and electric motor and thus generate unintentional changes in the drive torque. Instead, the speed controller provides speed change rates (speed gradients) to be controlled for the internal combustion engine and the electric motor, which are then taken into account in the equations for the principle of angular momentum of the torque equation system for the power-split gear.

A further advantage of this method is that the speed controller is already active and regulates to a required differential speed at the shift element, so that a controlled change in the speeds of the internal combustion engine and electric motor takes place after the shift element has been disengaged. A downstream application of additional torque to the internal combustion engine and the electric motor would lead to unwanted greater speed deviations.

DETAILED DESCRIPTION OF THE DRAWINGS

Figure 1:
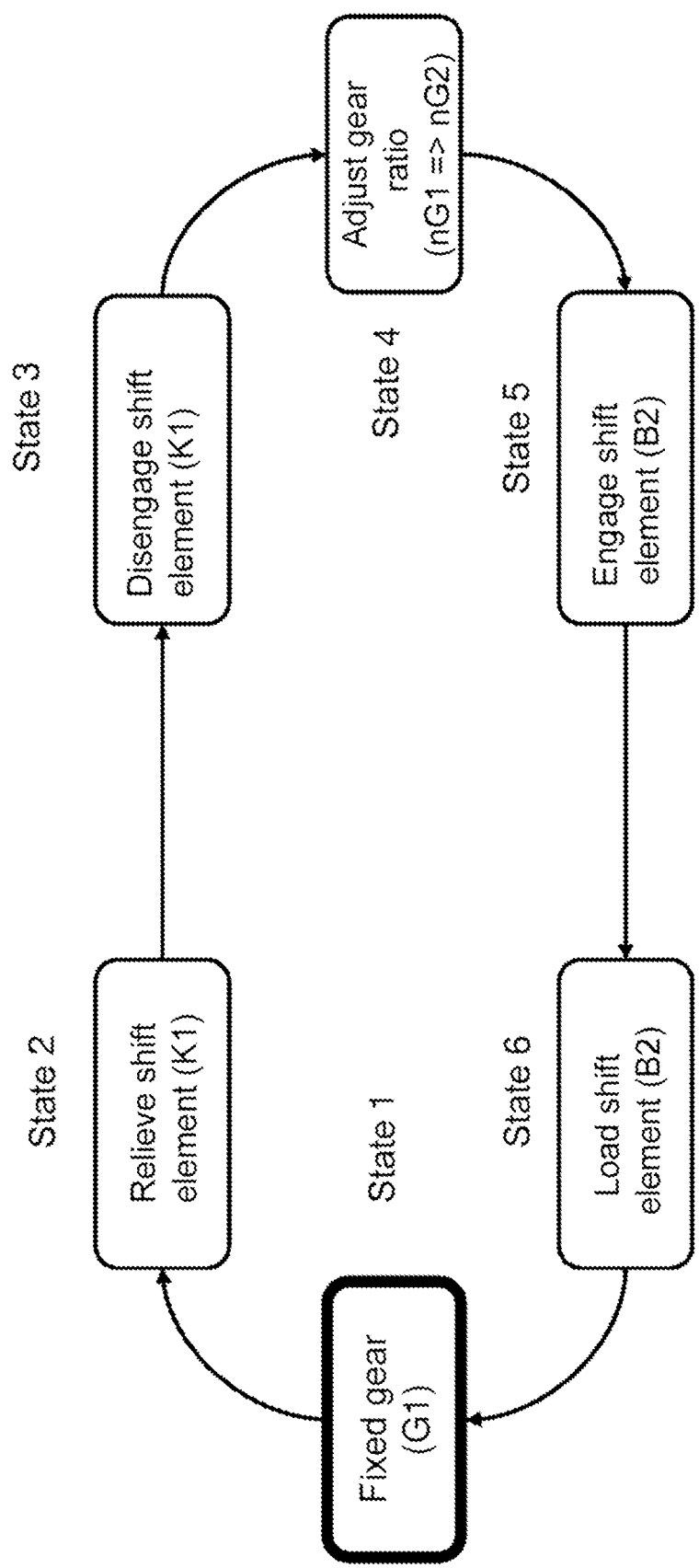
FIG. 1 shows state 1 of the entire shift sequence during a gear change with the automatic transmission according to the invention from a first fixed gear to a second fixed gear.

FIG. 1 shows the initial state, state 1, with the first gear engaged (fixed gear G1) before a gear change command. This is followed by a gear change command in an electronic control unit SG by a corresponding input signal.

Figure 2:
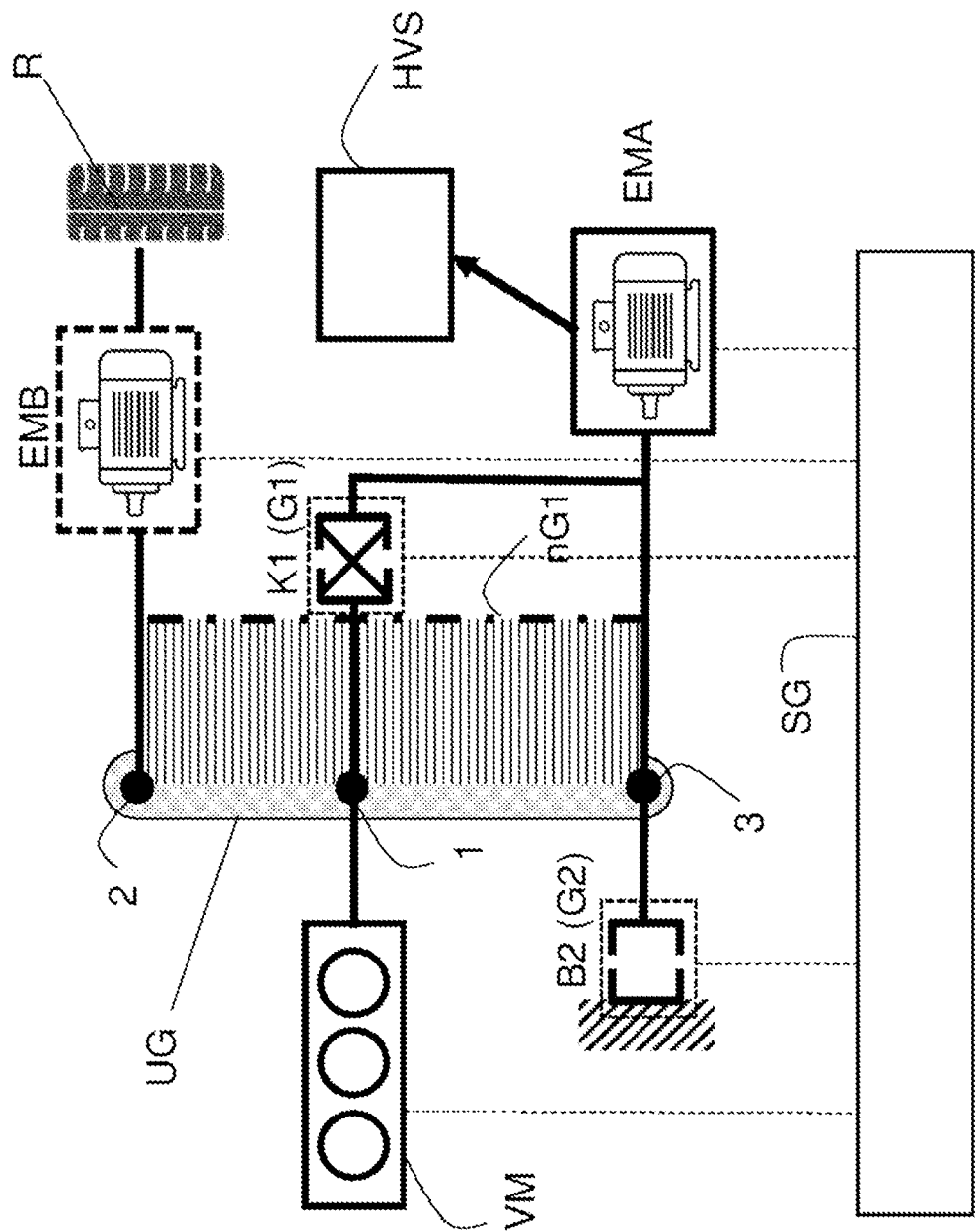
FIG. 2 schematically shows the essential components of a motor vehicle or transmission according to the invention and their states in state 1 of the entire shift sequence.

FIG. 2 shows the most important components of the invention, which also apply for FIGS. 4, 6, 8, 10, 12 and 14:

FIG. 2 schematically shows a hybrid vehicle comprising an automatic transmission, an internal combustion engine VM, a first electric motor EMA, a second electric motor EMB, a high-voltage accumulator HVS and an electronic control unit SG.

The automatic transmission comprises an epicyclic gearbox UG in the form of a power-splitting planetary gearbox, a variator comprising the two electric motors EMA and EMB, and a first shift element K1 provided for engaging a first fixed gear ratio G1 (hereinafter also referred to as fixed gear G1) and a second shift element B2 provided for engaging a second fixed gear ratio G2.

The number of two fixed gear ratios here is only for better illustration; in practice, a different number of gear ratios can also be used.

Furthermore, the automatic transmission comprises two transmission shafts, namely an input shaft in the form of a drive shaft by means of which the automatic transmission is coupled to the internal combustion engine VM in a torque-transmitting manner, and an output shaft in the form of a driven shaft by means of which the automatic transmission is coupled to the wheels R of the motor vehicle in a torque-transmitting manner.

The automatic transmission can also have three or more fixed gear ratios, in which case it would also have a correspondingly larger number of shift elements provided for engaging further gear ratios. Individual shift elements can also be provided for a plurality of gear ratios and/or a combination of a plurality of shift elements for one gear ratio.

The planetary gearbox UG comprises the carrier 1, the ring gear 2 and the sun 3. The epicyclic gearbox UG is coupled to both the input shaft and the output shaft in a torque-transmitting manner. Furthermore, the epicyclic gearbox UG comprises a shaft via which it can be coupled to the input shaft in a torque-transmitting manner by means of the first shift element K1, which here forms a clutch, and can be coupled to the second shift element B2, which here forms a brake, in a torque-transmitting manner. The shaft has a speed-adjusting effect on the internal combustion engine VM. In an alternative embodiment, the shift elements K1, B2 can be provided for any torque-transmitting functions.

The shift elements K1, B2 are each formed as claw clutches. This means that they are interlocking shift elements and require only a small retention force to be held in the closed position. In an alternative embodiment, the shift elements K1, B2 can be any other suitable shift elements, for example frictionally engaging shift elements.

The variator functionality for gear ratio adjustment is provided by operating the first electric motor EMA as a generator and the second electric motor EMB as a motor. This allows mechanical energy and electrical energy to be converted into one another and thus the speeds of the two electric motors EMA, EMB to be decoupled from one another.

Shifting the automatic transmission from a first gear ratio (fixed gear) G1 to a second fixed gear ratio (fixed gear) G2 is performed in accordance with the shift sequence illustrated with reference to FIGS. 3, 5, 7, 9, 11 and 13.

According to FIGS. 1 and 2, the first fixed gear ratio G1 is engaged, i.e., the first shift element K1 is closed and the second shift element B2 is open. Furthermore, the variator is decoupled; i.e., the electric motors do not take on a torque-transmitting function. All speeds nG1 are the same. The electric motors EMA, EMB can be operated as generators and as motors to charge the high-voltage accumulator HVS or boost drive power from the HVS.

Figure 3:
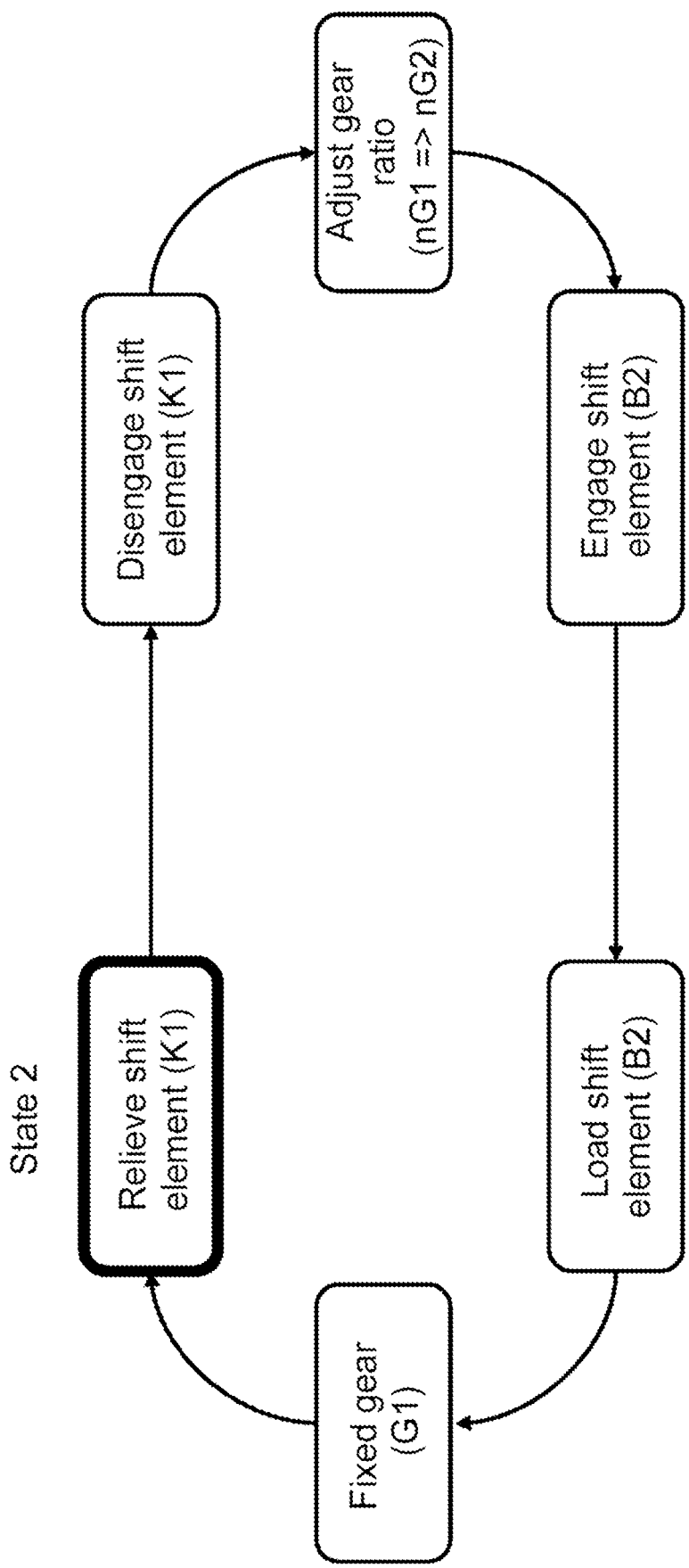
FIG. 3 shows state 2 of the entire shift sequence during a gear change with the automatic transmission according to the invention from a first fixed gear to a second fixed gear.

To shift to the second fixed gear ratio G2, the shift element K1 of the current (old) fixed gear G1 is now relieved, as shown in FIG. 3.

Figure 4:
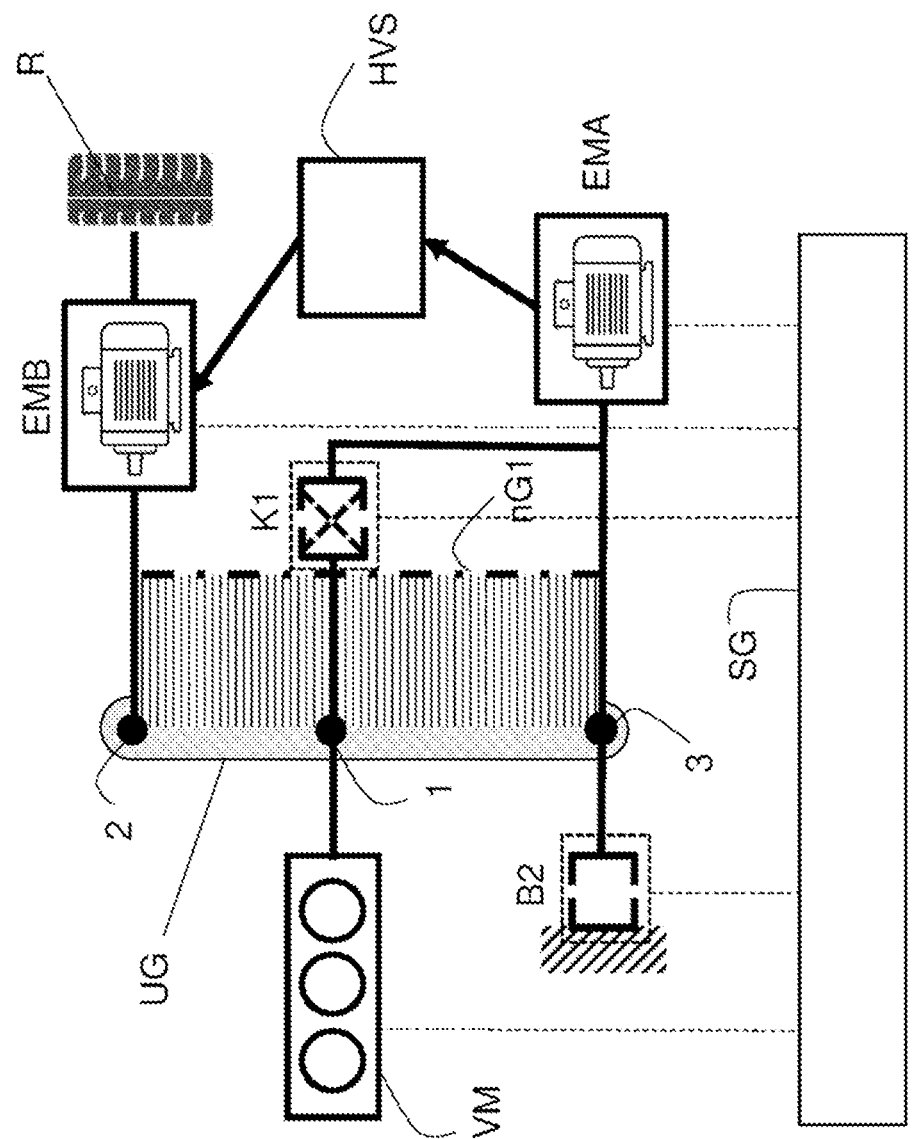
FIG. 4 schematically shows the essential components of a motor vehicle or transmission according to the invention and their states in state 2 of the entire shift sequence.

As can be seen in FIG. 4, the variator is coupled to the output shaft in a torque-transmitting manner and is also coupled to the epicyclic gearbox UG via the shaft in a torque-transmitting manner. In other words, the second electric motor EMB is motor-operated with the output or with the ring gear 2 or with the wheels R and is fed by the high-voltage accumulator HVS. The internal combustion engine VM can be switched off.

By means of the variator, the first shift element K1 is now relieved via the output shaft by a torque superposition (K1 shown dashed).

At this point, the core of the invention begins and will be explained again with reference to FIGS. 13 and 14.

Figure 5:
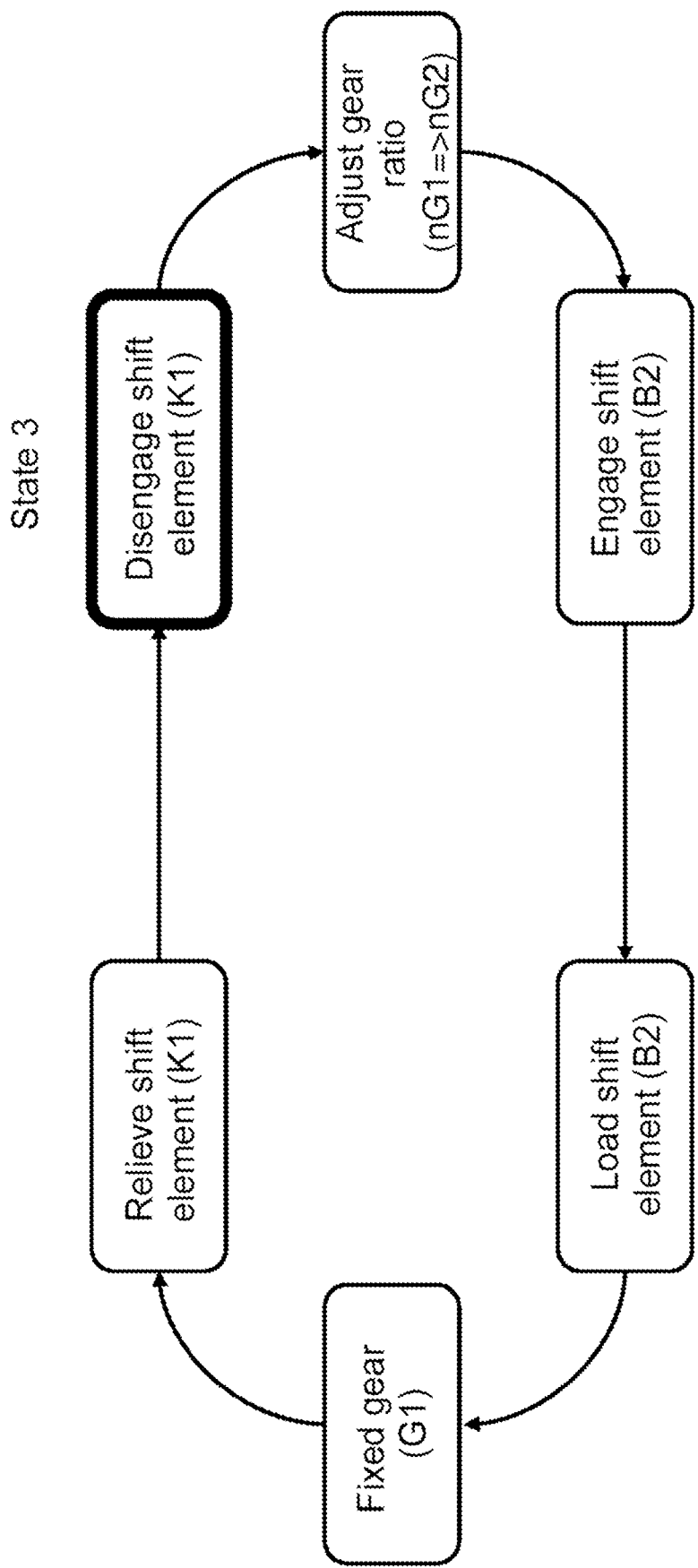
FIG. 5 shows state 3 of the entire shift sequence during a gear change with the automatic transmission according to the invention from a first fixed gear to a second fixed gear.
Figure 6:
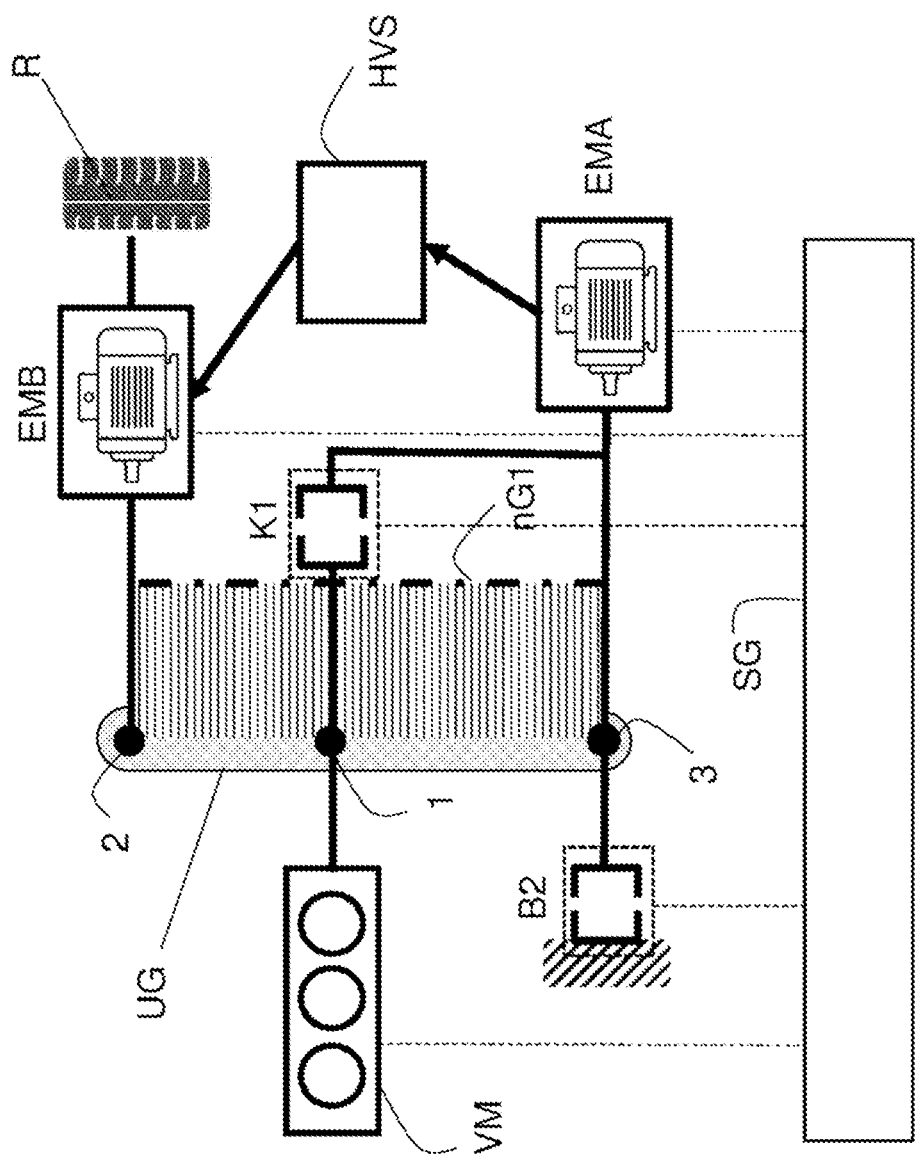
FIG. 6 schematically shows the essential components of a motor vehicle or transmission according to the invention and their states in state 3 of the entire shift sequence.

According to state 3, which is shown activated in FIG. 5, the shift element K1 is then disengaged, as shown in FIG. 6 with K1 open.

Figure 7:
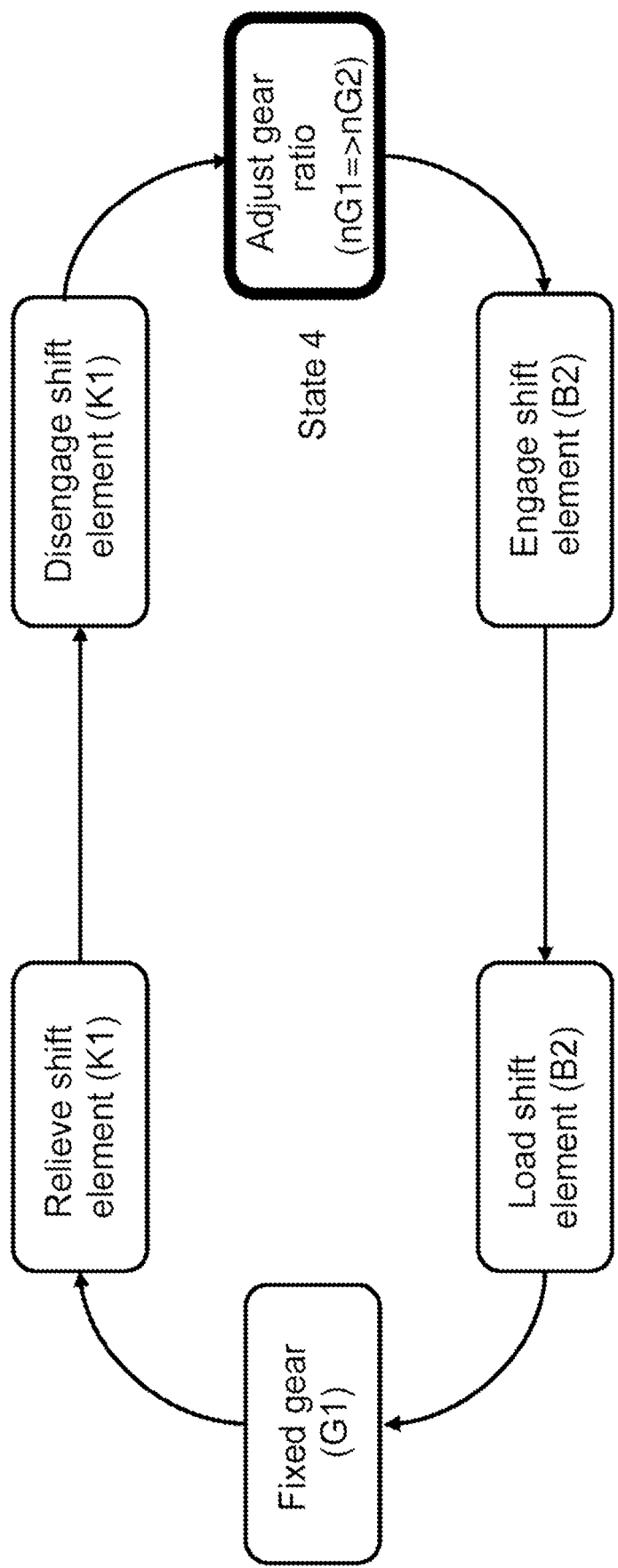
FIG. 7 shows state 4 of the entire shift sequence during a gear change with the automatic transmission according to the invention from a first fixed gear to a second fixed gear.
Figure 8:
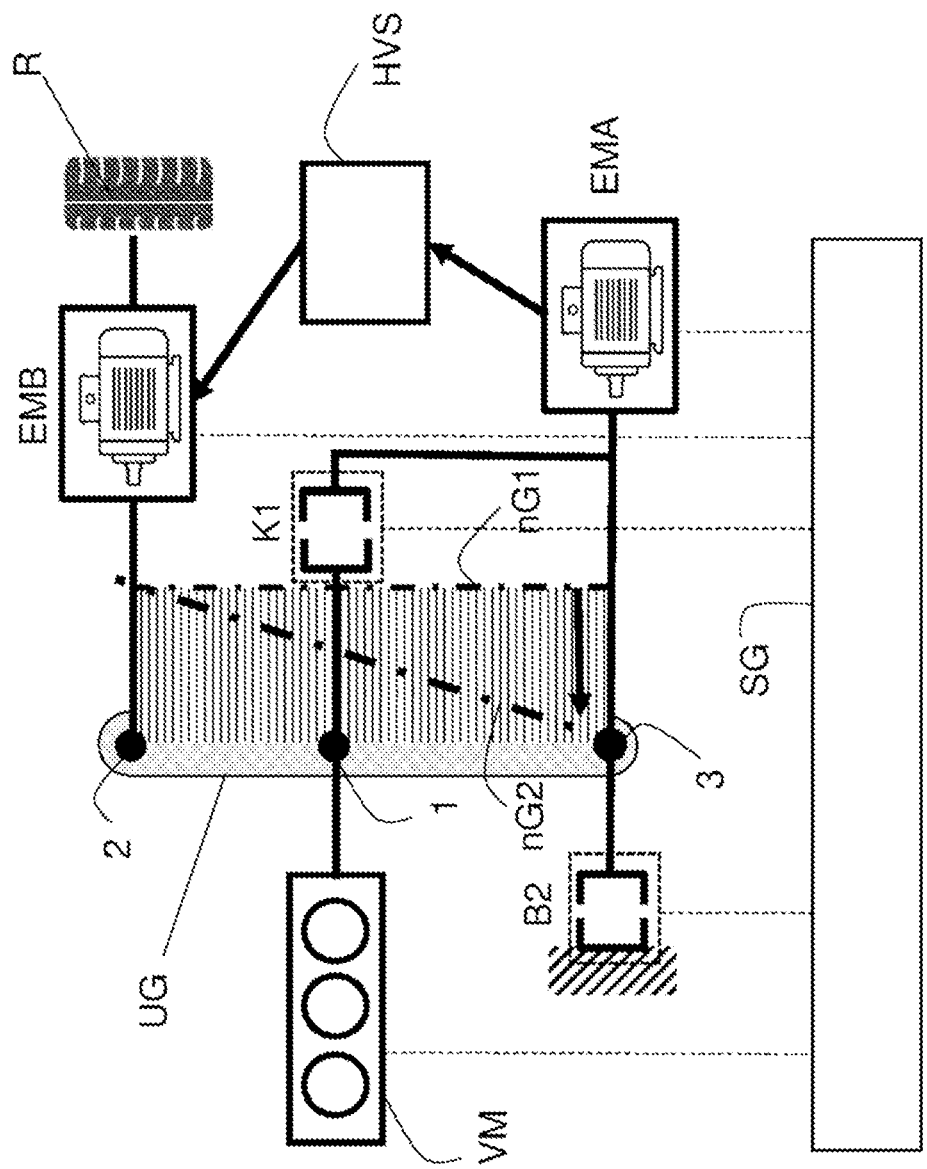
FIG. 8 schematically shows the essential components of a motor vehicle or transmission according to the invention and their states in state 4 of the entire shift sequence.

This is followed by state 4 according to FIG. 7, namely the preferably electrical and continuous gear ratio adjustment in a power-split gear ratio (E-CVT). This is illustrated in FIG. 8 by means of the speed shift at the sun 3. Accordingly, after the first shift element K1 is opened, the ratio of the second gear ratio (fixed gear) G2 is set by a continuous gear ratio adjustment of the variator or the electric motor EMA. The brake B2 is still open here.

This means that a 3-shaft operation is established, whereby the differential speed at the second shift element B2 is reduced.

Figure 9:
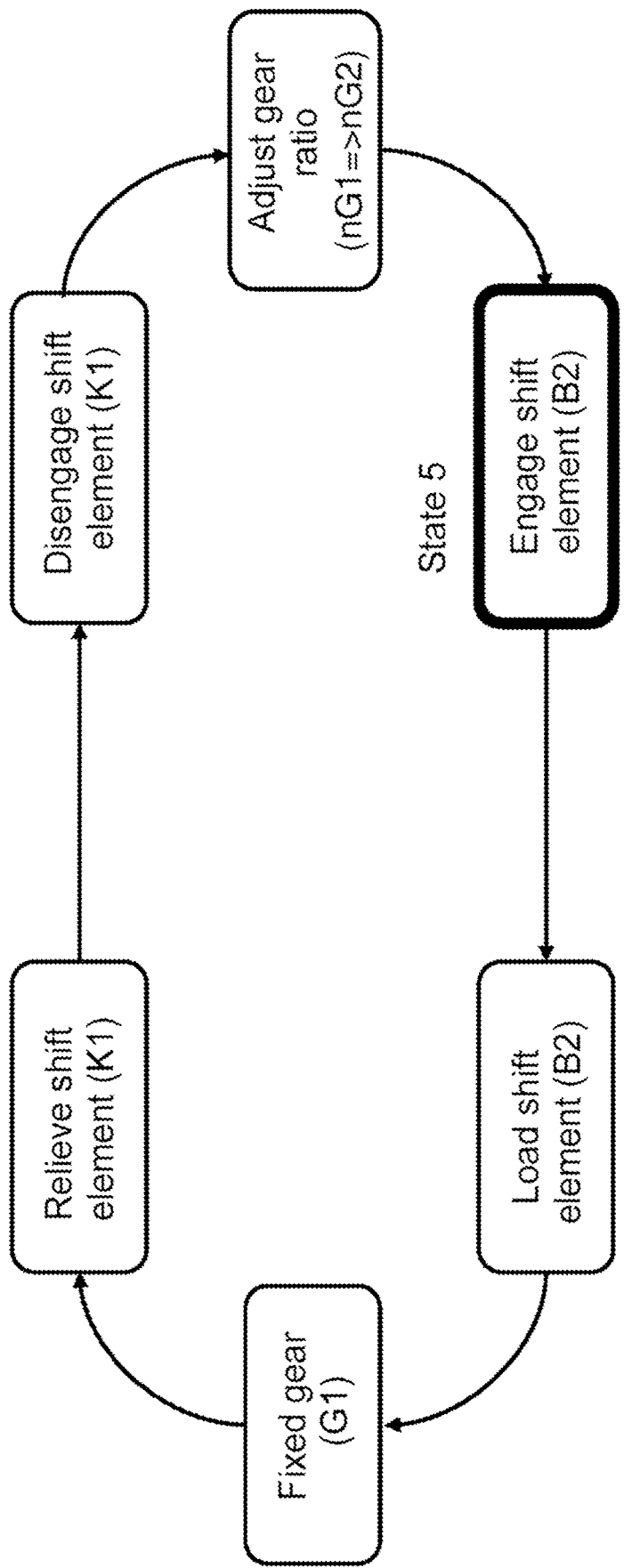
FIG. 9 shows state 5 of the entire shift sequence during a gear change with the automatic transmission according to the invention from a first fixed gear to a second fixed gear.

FIG. 9 shows the state 5 in which the shift element B2 is closed for the new fixed gear G2.

Figure 10:
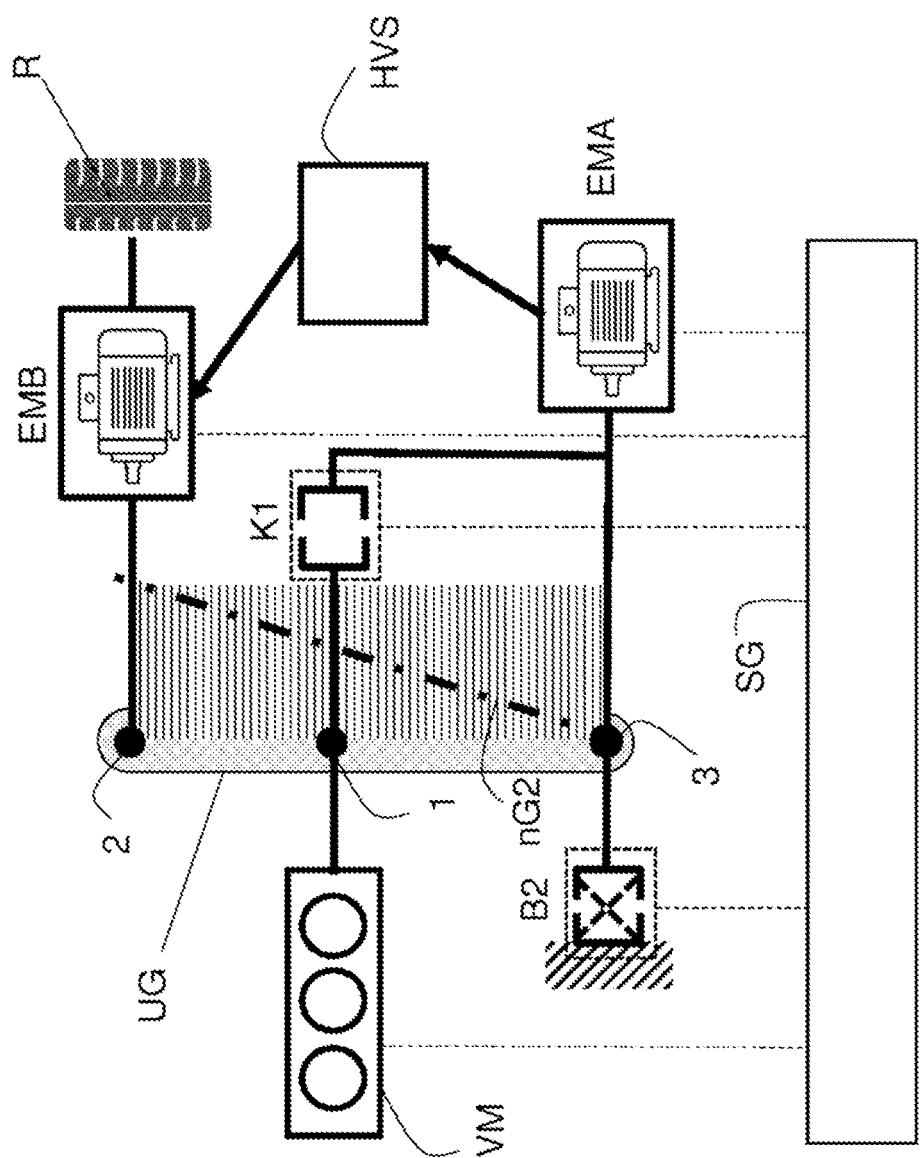
FIG. 10 schematically shows the essential components of a motor vehicle or transmission according to the invention and their states in state 5 of the entire shift sequence.

FIG. 10 shows here that the second shift element B2 is closed as soon as the differential speed has been reduced to zero or has fallen below a certain limit value. This causes the second shift element B2 to take over the load from the variator and the variator can be decoupled (see FIG. 10, dashed electric motor EMB). The brake B2 is not yet loaded (dashed B2).

Figure 11:
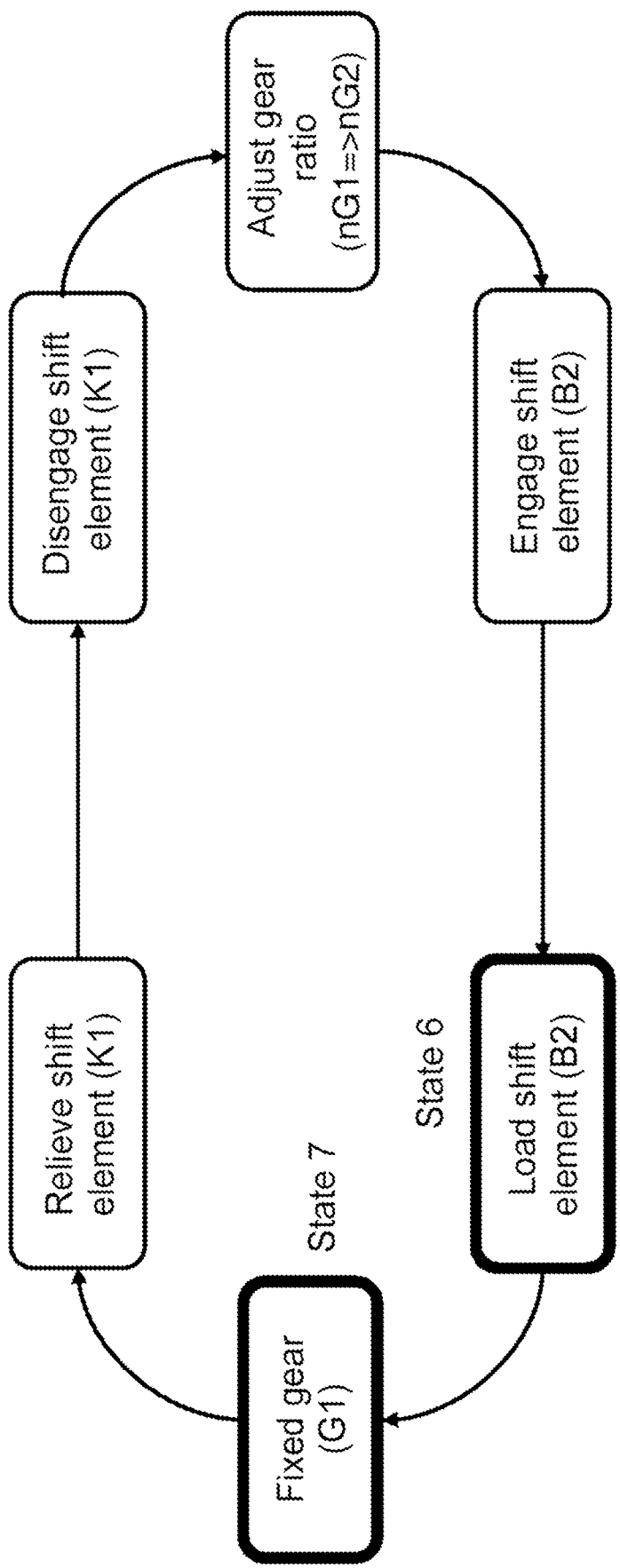
FIG. 11 shows states 6 and 7 of the entire shift sequence during a gear change with the automatic transmission according to the invention from a first fixed gear to a second fixed gear.
Figure 12:
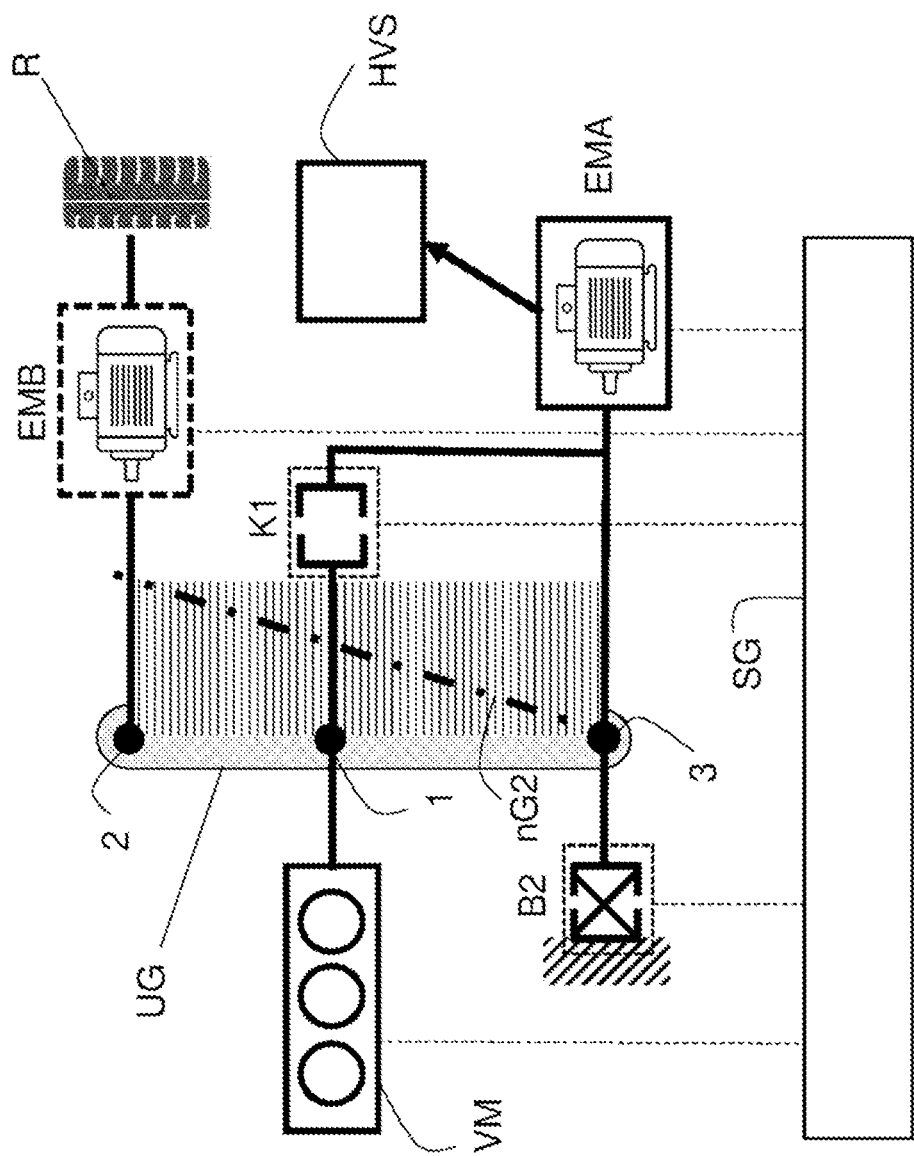
FIG. 12 schematically shows the essential components of a motor vehicle or transmission according to the invention and their states in states 6 and 7 of the entire shift sequence.

In FIG. 11, state 6 and directly associated with it state 7 or again 1 is reached, in which the new shift element B2 can be loaded (fully closed B2 in FIG. 12). FIG. 12 concludes the switching sequence of a gear change.

Figure 13:
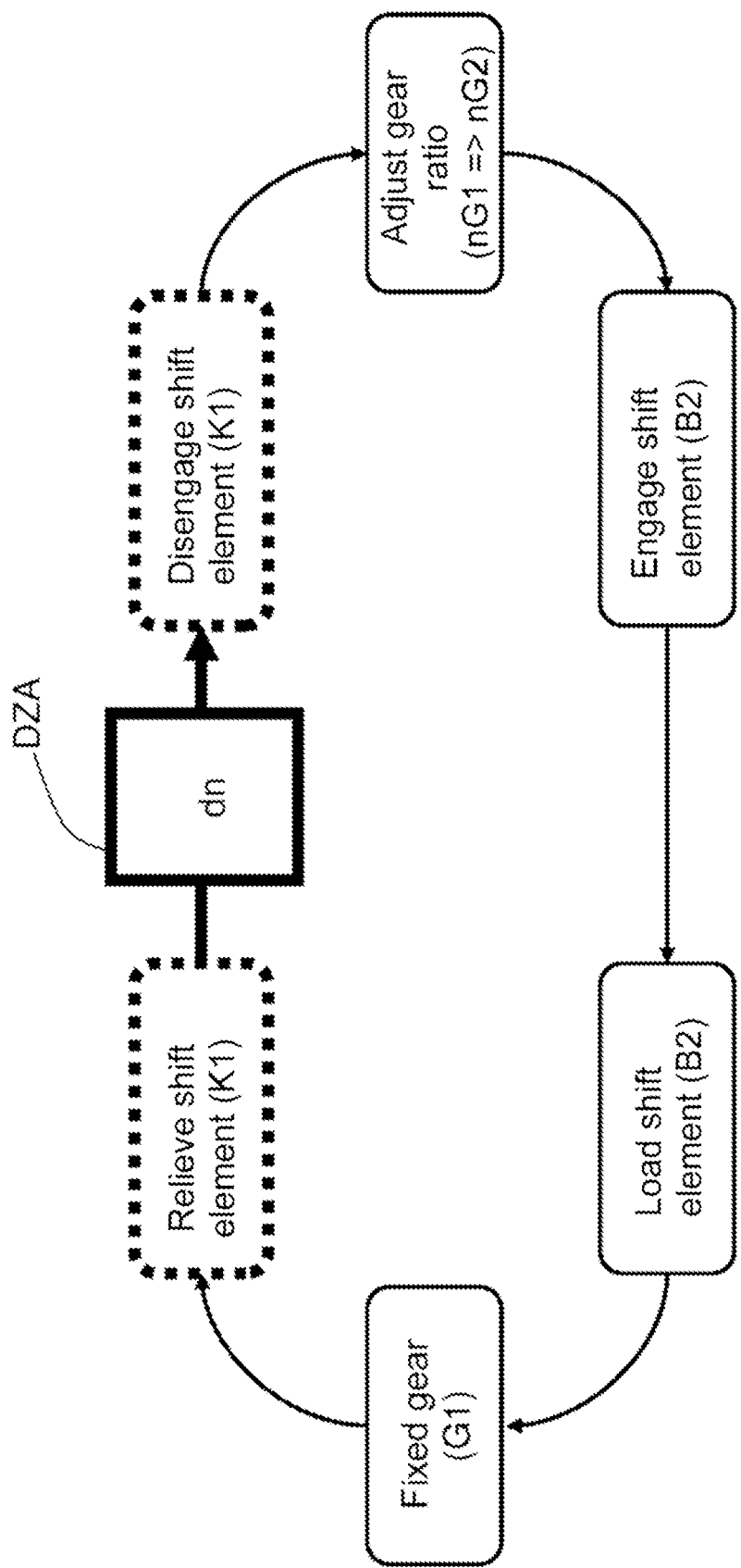
FIG. 13 shows the essential intermediate step according to the invention between states 2 and 3 of the entire shift sequence during a gear change with the automatic transmission according to the invention from a first fixed gear to a second fixed gear.
Figure 14:
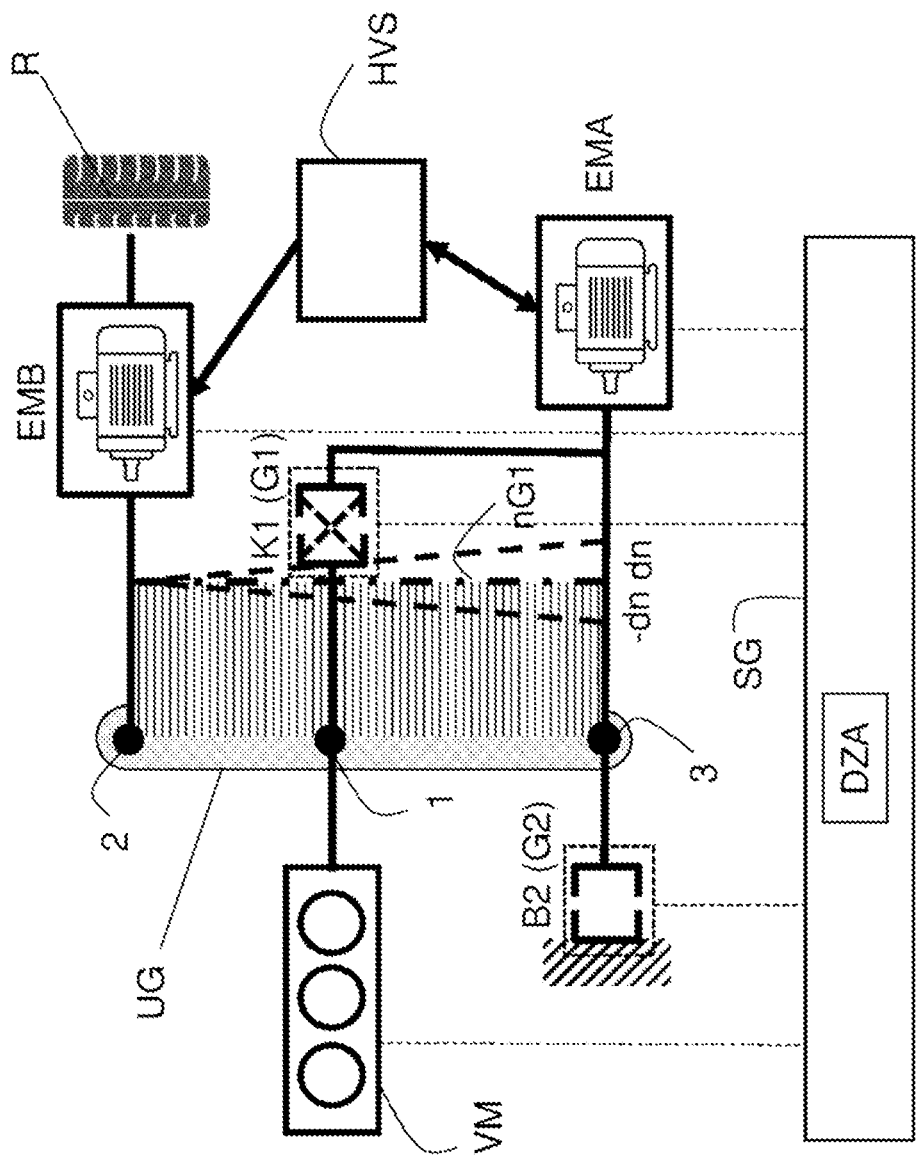
FIG. 14 schematically shows the essential components of a motor vehicle or transmission according to the invention and their states in the intermediate step of the entire shifting sequence.

In FIG. 13, the intermediate state according to the invention between state 2 and 3 is shown by a functional module DZA or by a method carried out by the control unit, the effect of which on the component behavior is shown in FIG. 14:

The shift element K1 to be opened is relieved in a torque-controlled manner by the two electric motors EMA and EMB (see also state 2).

The torque load is calculated and observed for the shift element K1 to be opened of the engaged fixed gear G1.

The torque load is observed with the objective of bringing about a load change by means of a zero crossing in order to establish freedom from load at the shift element K1.

For establishing the freedom from load for the shift element K1 to be opened, the first electric motor EMA and the internal combustion engine VM are controlled in a power-split manner such that they maintain the gear ratio of the previously engaged fixed gear G1 in terms of the speeds nG1 and put the shift element K1 to be opened in an at least nearly load-free state in terms of the torques.

A load change is brought about at the shift element K1 to be opened by a differential speed dn/—dn opposite the calculated torque load at the shift element K1 to be opened being specified at the shift element K1.

At the same time, the actuator of the shift element K1 is activated for opening, in order to generate a preload which, in the case of the so to speak random zero crossing, leads to easy opening of the shift element K1 on account of the above-mentioned speed regulation, speed adaptation and differential speed specification.

Summary of the entire shifting sequence with the intermediate state according to the invention starting from the current fixed gear:

Relieving of the old shift element K1 by the E-motors (state 2).

Activation of the functional module for speed adaptation DZA (generation of a load change at the shift element K1 to be opened and simultaneous control of the actuator for opening the shift element K1).

Opening of the old shift element K1 (state 3) (change to an E CVT mode).

Speed adaptation for gear ratio adjustment (nG1=>nG2) in the transmission via the E CVT mode (state 4).

Engagement of the new shift element (B2) (state 5).

Loading of the new shift element (B2) (state 6).

"Dropping" of the E-motors EMA and EMB (state 7=state 1)=>new fixed gear G2.

The invention claimed is:
1. A motor vehicle, comprising:
at least two drive motors, wherein at least one drive motor of the at least two drive motors is an electric motor;
a high-voltage accumulator;
an automatic transmission which has at least one fixed gear ratio and at least one power-split gear ratio for gear ratio adjustment starting from the at least one fixed gear ratio; and
an electronic control unit operatively configured such that, when a gear change command is present:
a shift element to be opened of the fixed gear ratio to be disengaged is relieved in a torque-controlled manner by at least two of the at least two drive motors,
a torque load is calculated and observed for the shift element to be opened,
the torque load is observed with an objective of bringing about a load change by way of a zero crossing in order to establish freedom from load at the shift element,
for establishing the freedom from load for the shift element to be opened, a first drive motor of the at least two drive motors and a second drive motor of the at least two drive motors are controlled in a power-split so as to maintain the gear ratio of the previously engaged fixed gear ratio in terms of speeds and put the shift element to be opened in an at least nearly load-free state in terms of torques, and
the load change is brought about at the shift element to be opened by a differential speed, opposite the calculated torque load at the shift element to be opened, being specified at the shift element,
wherein when a defined threshold value of the observed torque load on the shift element to be opened is exceeded, a sign of a required differential speed on the shift element to be opened is changed for a speed controller.

2. The motor vehicle according to claim 1, wherein
an I term of an already active speed regulation of the power split or a functional module comparable to a behavior of the I term is used to actively bring about the load change at the shift element to be opened, wherein the I term represents the required differential speed on the shift element to be opened.

3. The motor vehicle according to claim 1, wherein
an actuator for opening the shift element is already controlled before a start of the load change.

4. The motor vehicle according to claim 1, wherein the automatic transmission comprises:
an epicyclic gearbox;
the shift element;
the electric motor as the drive motor which is part of a variator; and
actuators which are controllable by the electronic control unit.

5. The motor vehicle according to claim 1, wherein the electronic control unit comprises:
a functional module for controlling the at least two drive motors and the shift element such that:
the shift element to be opened of the fixed gear ratio to be disengaged is relieved in a torque-controlled manner by the at least two drive motors,
the torque load is calculated and observed for the shift element to be opened,
the torque load is observed with the objective of bringing about a load change by means of a zero crossing in order to establish freedom from load at the shift element,
for establishing the freedom from load for the shift element to be opened, the first drive motor and the second drive motor are controlled in the power-split manner such that they maintain the gear ratio of the previously engaged fixed gear ratio in terms of speeds and put the shift element to be opened in an at least nearly load-free state in terms of torques, and
the load change is brought about at the shift element to be opened by the differential speed, opposite the calculated torque load at the shift element to be opened, being specified at the shift element.

6. A method for shifting an automatic transmission in a motor vehicle, the motor vehicle having:
at least two drive motors, wherein at least one drive motor of the at least two drive motors is an electric motor;
a high-voltage accumulator;
an automatic transmission which has at least one fixed gear ratio and at least one power-split gear ratio for gear ratio adjustment starting from the at least one fixed gear ratio; and
an electronic control unit;
the method comprising:
relieving the shift element to be opened of the fixed gear ratio to be disengaged in a torque-controlled manner by the at least two drive motors;
calculating the torque load and observing for the shift element to be opened,
wherein the torque load is observed with the objective of bringing about a load change by way of a zero crossing in order to establish freedom from load at the shift element;
controlling, for establishing the freedom from load for the shift element to be opened, a first drive motor of the at least two drive motors and a second drive motor of the at least two drive motors in a power-split manner such that they maintain the gear ratio of the previously engaged fixed gear ratio in terms of speeds and put the shift element to be opened in an at least nearly load-free state in terms of torques, and
bringing about a load change at the shift element to be opened by a differential speed opposite the calculated torque load at the shift element to be opened being specified at the shift element,
wherein when a defined threshold value of the observed torque load on the shift element to be opened is exceeded, a sign of the required differential speed on the shift element to be opened is changed for a speed controller.

* * * * *